June 27, 1967   L. G. ANDERSON   3,327,806
SING AROUND VELOCIMETER
Filed April 26, 1966   2 Sheets-Sheet 1

INVENTOR.
LEWIS G. ANDERSON
BY
H. H. Losche
ATT'YS.

INVENTOR.
Lewis G. Anderson

United States Patent Office 3,327,806
Patented June 27, 1967

---

3,327,806
SING AROUND VELOCIMETER
Lewis G. Anderson, Columbus, Ohio, assignor, by mesne assignments, to the United States of America as represented by the Secretary of the Navy
Filed Apr. 26, 1966, Ser. No. 546,153
6 Claims. (Cl. 181—.5)

This invention relates to sing around velocimeters and more particularly to a sing around ultrasonic velocimeter using a level detector and a zero crossing detector to establish a precise point in each echo pulse packet of transducer oscillations to establish the velocity of sounds through liquids for precision calibration as a pressure sensor.

A pressure sensor has been constructed using the velocity of sound in water as an indication of pressure. A measure of sound velocity is obtained by using a sing around velocimeter. The sequence of operation of such a velocimeter is to transmit a sound pulse into the water, then to detect its echo arrival after it has traveled a fixed distance and back in a sound path. The detection of the arrival of this pulse triggers the transmitter which then transmits another pulse. The cycle then continues in this "sing around" manner. An indication of velocity is obtained by measuring the repetition rate of pulse transmissions with a counter, such systems being more fully shown and described in the publications The Review of Scientific Instruments, volume 28, No. 11, for November 1957, the article entitled "Sing-Around Ultrasonic Velocimeter for Liquids," beginning on page 897, and IRE Transactions on Instrumentation, volume 1–9, No. 3, for December 1960, the article "An Improved Sing-Around System For Ultrasonic Velocity Measurements," beginning on page 359. The technique for detecting the arrival of the echo acoustical signals, transduced to electrical signals, is difficult to accomplish with precision. An instrument having a sound path of 10 centimeters corresponds to a transit time of 130 microseconds. The transit time is the time required for the sound pulse to travel from the transducer to the reflecting end of the sound path and back again. This interval is increased to about 4 milliseconds by allowing the sound to make several round trips before it is allowed to retrigger the transmitter. One part per million sensitivity on a 4 millisecond sing-around interval is 4 nanoseconds. Due to the unavailability of a time interval meter that can measure 4 milliseconds with better than 4 nanoseconds precision it is necessary to count in the order of 256 of these 4 millisecond sing-around periods and measure their total elapsed time. The received pulses are pulse packets made up of 20 to 30 sinusoidal-like cycles at the resonant frequency of the transducer. The 4 nanosecond precision, then, makes it necessary to not only detect the arrival of the same cycle in each pulse echo packet but also to detect a certain point of the cycle. In prior known divices a level detector was used to detect the certain point of each pulse packet. The level detector had to establish a threshold level greater than the peak of one cycle and below the peak of the next cycle. To minimize the variation in the firing time the amplitude of the chosen cycle in these pulse packets should be as large as possible and the threshold level made as small as possible. Since both of these conditions cannot be met, inaccuracies develop in precisely detecting the certain point in each cycle of each pulse echo packet.

In the present invention the sing-around velocimeter includes an initial detector to detect the arrival of the desired cycle in the echo packet of each sinusoidal-like echo pulse and includes a zero-crossing detector to detect the next zero-crossing of the sinusoidal cycle following the detection of the desired cycle. An echo selector selects the number of round trip echoes, such as 29, to control a gate for gating the 30th echo packet into the initial detector. The initial detector controls a gate in the zero-crossing detector circuit to gate a pulse to the transmitter at the precise moment of echo pulse crossover following the arrival of the desired cycle in the selected pulse echo packet thus providing extreme accuracy in the time interval measurement of the velocity of sound in selected liquids. The velocity measurements can then be used in the calibration of pressure. It is therefore a general object of this invention to provide a sing around acoustical velocimeter circuit capable of selecting a predetermined cycle and zero crossover of this cycle in a selected echo pulse packet of acoustical echo signals, transduced to electrical signals, for making accurate time interval velocity measurements in known liquids to determine liquid pressure.

These and other objects and the attendant advantages, features, and uses will become more apparent to those skilled in the art as the description proceeds when considered along with the accompanying drawings, in which.

Figure 1:
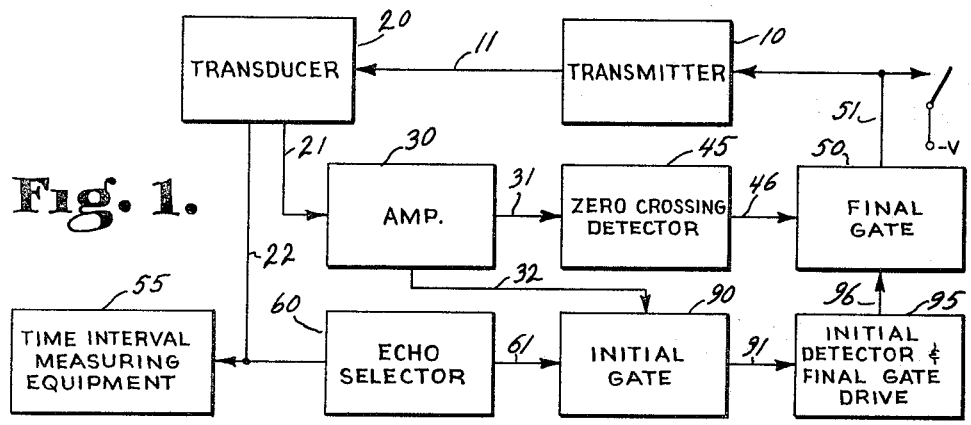
FIGURE 1 is a block circuit diagram showing the combination of components in the velocimeter having arrows on the conductor means indicating the direction of information.

Referring more particularly to FIGURE 1, a transmitter 10 for generating transmitter pulses by way of conductor means 11 to a transducer 20 causes the transducer 20 to produce acoustical pulses for liquid velocity measurements when submerged in a liquid. Transducer 20 also receives echo acoustical pulses back from the transmitted pulses and reconverts these acoustical pulses back to electrical pulses, as will more fully be described in the description of FIGURE 2. The received echo pulses are conducted by way of conductor means 21 to an amplifier 30 and by way of conductor means 22 to time interval measuring equipment 55. Amplifier 30 has one output over the conductor means 31 to a zero crossing detector 45 and over a second output conductor 32 to an initial gate 90. The output 46 of the zero crossing detector 45 is conducted as one input to a final gate 50, the output 51 thereof being coupled to the transmitter 10 for triggering same to produce a transmitter pulse. The output of the transducer 20 over conductor 22 is also coupled to an echo selector circuit 60 which selects a predetermined echo pulse to produce a control signal over its output 61 to control the initial gate 90. When initial gate 90 is open, the output from the amplifier 30 over the conductor means 32 is gated through to the output 91 to an initial detector and final gate drive circuit 95 to produce a control signal over its output 96 to control the final gate 50. Transmitter 10, then will be caused to generate a pulse over its output 11 to the transducer 20 for every echo signal selected by the echo selector 60 and gated by the initial gate 90 and final gate 50 to time the velocity of the transmitted pulses in the liquid by the time interval measuring equipment 55. The means of accomplishment is more fully disclosed and described in FIGURE 2.

Figure 2:
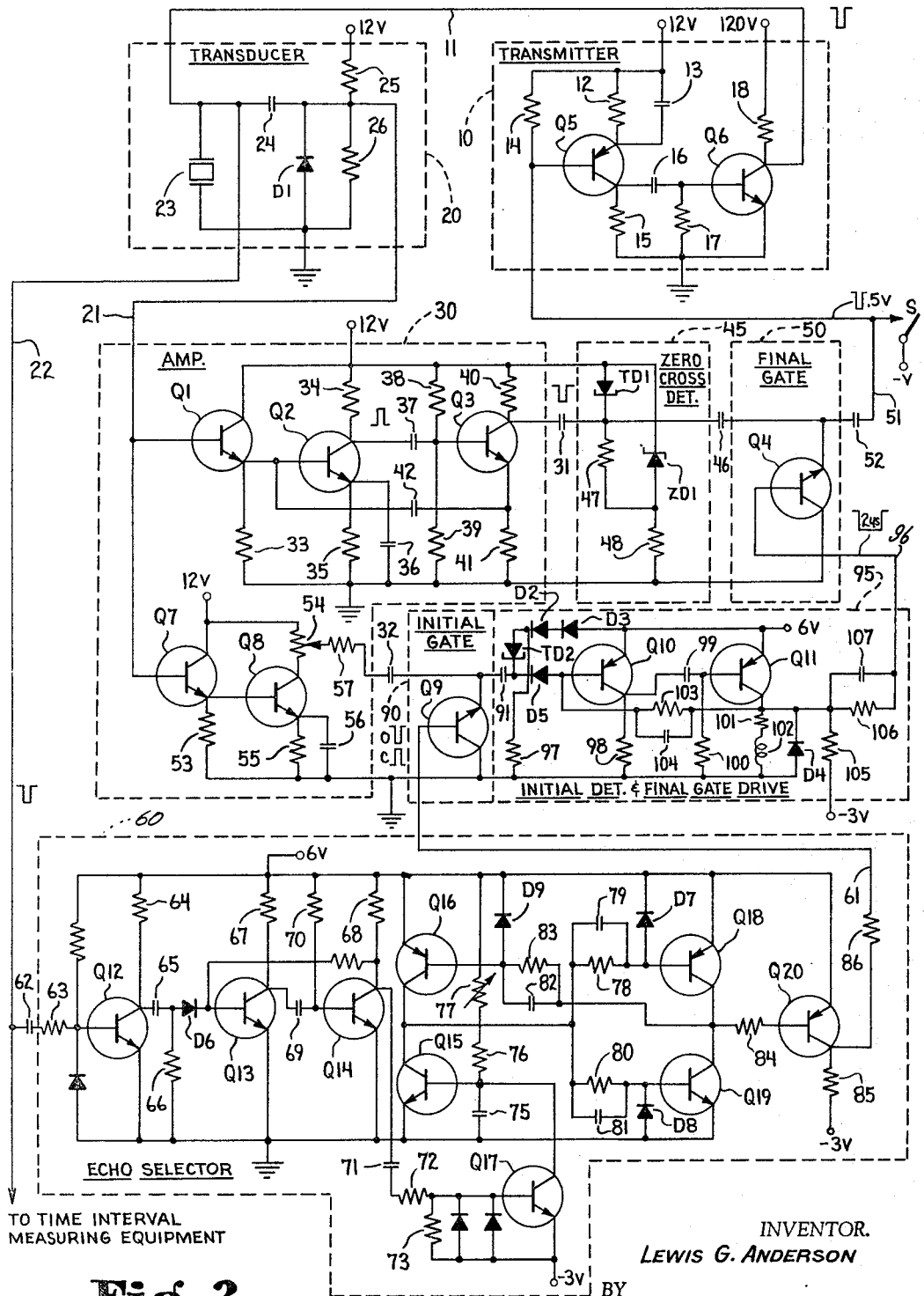
FIGURE 2 is a circuit schematic diagram of the combination shown in FIGURE 1.

Referring more particularly to FIGURE 2, transmitter 10 consists of a pair of transistors Q5 and Q6 in which the transistor Q5 is coupled to a voltage source, herein shown as being a 12 volt source for the purpose of example, although other voltages may be used as desired. Transistor Q5 is a PNP type having its emitter coupled through a parallel resistance 12 and capacitance 13 to the 12 volt source. The base of transistor Q5 is coupled through a biasing resistor 14 to the 12 volt source. The collector of transistor Q5 is coupled through a collector load resistor 15 to the opposite pole of the 12 volt source of zero potential, herein shown to be fixed, such as ground. The collector of transistor Q5 is capacitor coupled through a capacitor 16 to the base of transistor Q6 of NPN type, this case being biased from ground through the resistor 17. The collector of transistor Q6 is coupled through a collector load resistor 18 to a voltage source herein shown to be 120 volts. Transistor Q6 operates as an avalanche transistor by virtue of being placed into full conduction whenever transistor Q5 is rendered conductive to discharge capacitor 13 directly to the base of transistor Q6. The output conductor 11 of the transmitter is coupled to the collector of transistor Q6.

The transducer 20 includes a crystal 23 that is placed in a container with a diaphragm for submergence in the liquid to be tested to transduce electrical signals applied thereto into acoustical signals in the liquid and for reconverting acoustical echo signals back to electrical signals. The conductor 11 is coupled to one side of the crystal 23 while the opposite side of the crystal 23 is coupled to the fixed potential or ground. Conductor 11 coupled into the transducer 20 is likewise coupled to the output conductor 22 and to one plate of a coupling capacitor 24, the opposite plate of which is coupled through a resistor 25 to a voltage source, herein shown by way of example as being 12 volts. The junction of the capacitor 24 and resistor 25 is coupled through a paralled circuit to a diode D1 and resistor 26 to the fixed potential. In the examples of voltages shown herein the elements of the transducer 20 will provide a capacitance that will be charged to approximately 100 volts by virtue of the voltage divider 25, 26 but when a negative transmitter pulse from transmitter 10 is applied to transducer 20, this capacitance will be rapidly discharged producing an electrical jolt on the crystal 23 thereby producing an acoustical pulse in the liquid. The diode D1 prevents the junction of voltage divider 25, 26 from going negative. The negative transmitter pulse conducted to the transducer 20 is also conducted by way of conductor 22 to the time interval measuring equipment which establishes its starting count or time measurement between pulses.

The output conductor 21 from the transducer 20 is taken from the junction of capacitor 24, resistor 25, diode D1, and resistor 26 and applied in common to the base electrodes of an NPN transistor cathode follower Q1 and an NPN transistor cathode follower Q7 in the amplifier circuit 30. Amplifier 30 must amplify the echo signals from the transducer and provide separate output signals for both the initial gate 90 and the zero crossing detector 45. The initial detector and the zero crossing detector will be well isolated from each other by virtue of the transistor emitter followers Q1 and Q7. Transistor Q1 has its collector directly coupled to a voltage source, herein shown by way of example as being 12 volts, while its emitter is coupled through an emitter load resistor 35 to the fixed potential or ground. The emitter of transistor Q1 is coupled to a feedback amplifier circuit coupled in cascade consisting of the circuit for NPN transistors Q2 and Q3. The collector of transistor Q2 is coupled to the 12 volt source through a collector load resistor 34 while its emitter is coupled through a resistor 35 and capacitor 36 in paralled to the fixed potential. The collector of transistor Q2 is also capacitor coupled through a capacitor 37 to the base of transistor Q3 which base is biased through a voltage dividing circuit consisting of resistors 38 and 39. The collector of transistor Q3 is coupled by collector load resistor 40 to the 12 volt source and the emitter thereof is coupled to the fixed potential through an emitter load resistor 41. The emitter of transistor Q3 is coupled through a capacitor 42 to the base of transistor Q2 providing the feedback circuit. The output of this channel of the amplifier is taken from the collector of transistor Q3.

The zero crossing detector 45 consists of a tunnel diode TD1 having its anode coupled to the 12 volt source and its cathode coupled to the output conductor from the collector of the amplifier 30 through a coupling capacitor 31. The zero crossing detector TD1 is biased by a Zener diode ZD1 and the resistors 47 and 48. The Zener diode is oriented with its cathode coupled to the 12 volt source and its anode coupled through the resistor 48 to the fixed potential. The anode of the Zener diode ZD1 produces its bias on the cathode of the tunnel diode TD1 through the resistor 47. The output of the zero crossing detector is taken from the cathode of the tunnel diode TD1.

The final gate 50 has its input coupled to the output of the zero crossing detector TD1 by the coupling capacitor 46 and produces its output on the conductor means 51 through the coupling capacitor 52. Gating of the final gate circuit 50 is produced by the inverted NPN transistor Q4 having its emitter directly coupled to the conductor connecting the coupling capacitors 46 and 52 and its collector coupled directly to the fixed potential. Whenever the transistor Q4 is conductive, the final gate 50 is closed since all signals passing to conductor means 51 will be grounded. When transistor Q4 is nonconductive, the final gate 50 will be opened for conduction of the signals from the zero crossing detector 45 over the output conductor 51. The base electrode of transistor Q4 is the final gate control input.

The emitter follower transistor Q7 in the amplifier 30 has its collector directly coupled to the 12 volt source, for the purpose of example of voltage supply herein, and its emitter coupled through an emitter load resistor 53 to ground and also coupled to the base of an NPN transistor Q8. The collector of transistor Q8 is coupled through the resistance element of a potentiometer 54 while the emitter of transistor Q8 is coupled through a parallel resistor 55 and capacitor 56 to ground. The output coupling 32 of the amplifier 30 is taken from the adjustable tap of the pententiometer 54 through a current limiting resistor 57. As may be seen in FIGURE 2, one channel of the amplifier outputs must introduce a phase inversion since both detectors require negative going signals for detection and they operate on opposite sides of the same half cycle.

The initial gate 90 has its input coupled through the coupling capacitor 32 and its output coupled to one plate of the coupling capacitor 91. This conductor coupling one plate of each capacitor 32 and 91 is directly connected to the emitter of an NPN gating transistor Q9, the collector of which is directly coupled to ground. The base of transistor Q9 is the input control electrode for placing transistor Q9 in the conductive or nonconductive state. If transistor Q9 is conductive, any signal coming by way of the coupling capacitor 32 from the amplifier will be grounded, whereas, Q9 in the nonconductive state will allow these signals to pass through capacitors 32 and 91.

The initial detector and final gate drive 95 has its input coupled to the coupling capacitor 91 and its output taken from the conductor means 96 connected to the base of transistor Q4 in the final gate 50. The initial detector consists of a tunnel diode TD2 having its cathode coupled to the input conductor from the output plate of coupling capacitor 91 and its anode biased through the biasing diodes D2 and D3 in series from a voltage source, herein shown to be 6 volts for the purpose of example, and through a biasing resistor 97 to the fixed or zero potential. The cathode of the tunnel diode TD2 is coupled to the cathode of a diode D5, the anode of which is coupled directly to the base electrode of transistor Q10 of a monostable multivibrator including both PNP transistors Q10 and Q11. The emitter electrodes of Q10 and Q11 are each coupled directly to the 6 volt source while the collector electrode of transistor Q10 is coupled through a collector load resistor 98 and through a coupling capacitor 99 to the base of transistor Q11 this base being biased through a biasing resistor 100 coupled to ground. The collector of transistor Q11 is coupled through a resistor 101 and a choke coil 102 to ground, this series coupling of 101 and 102 being paralleled by a diode D4 with its anode oriented to ground and its cathode coupled to the collector of transistor Q11. The collector of transistor Q11 is coupled through a resistor 103 and a capacitor 104 in parallel to the base of transistor Q10 as a feedback circuit. The collector of transistor Q11 is also coupled to a negative voltage source through a resistor 105 and is also connected through a parallel circuit resistor 106 and capacitor 107 to the output conductor 96. The monostable multivibrator circuit of transistors Q10 and Q11 is designed to produce a negative output pulse in its quasistable condition of one and one-half to two microseconds in time. This pulse applied to the case of transistor Q4 will control the final gate for the one and one-half to two microseconds for the purpose later to be more fully described in the description of operation of the circuit.

The output 22 from the transducer 20 is capacitor coupled to a capacitor 62 in series with a resistor 63 to the base of an inverter NPN transistor Q12. The collector of transistor Q12 is coupled through a collector load resistor 64 to a positive voltage source, herein shown to be 6 volts for example, and its emitter coupled directly to ground. The collector of transistor Q12 is coupled in series through a capacitor 65 and a diode D6 to the base of the first transistor Q13 of a pair of NPN transistors Q13 and Q14 in a monostable multivibrator circuit. The junction of capacitor 65 and the anode of D6 is biased from ground through a resistor 66. The collectors of each of the transistors Q13 and Q14 are coupled through resistors 67 and 68 to the positive voltage source, respectively, and the emitters thereof each coupled directly to ground. The collector of transistor Q13 is coupled through a capacitor 69 to the base of transistor Q14 which base is biased from the positive voltage source through a biasing resistor 70. The collector of transistor Q14 is coupled in series through a capacitor 71 and a resistor 72 to the base of an NPN transistor Q17 having its emitter coupled directly to a negative voltage source and its base coupled to this negative voltage source in parallel through a biasing resistor 73 and a pair of diodes. The collector of transistor Q17 is coupled directly to the base of a transistor Q15 in a zero dead time monostable multivibrator composed of PNP transistors Q16, Q18, Q20 and NPN transistors Q15, Q17, Q19. The base of transistor Q15 is coupled to a timing capacitor 75 and also through a fixed resistor 76 and an adjustable resistor 77 to the positive voltage source. The collector of transistor Q15 is coupled in common with the collector of transistor Q16, the emitter of which is directly coupled to the positive voltage source. The common coupling of the collectors of transistors Q15, Q16 is also coupled to base biasing networks of transistors Q18 and Q19, these networks comprising parallel networks of resistor 78 and capacitor 79 and of resistor 80 and capacitor 81, respectively. The base of transistor Q18 is coupled through a diode D7 to the voltage source in the low resistance direction and the base of transistor Q19 is coupled to ground through a diode D8 in the high resistance direction. The collectors of transistors Q18 and Q19 are coupled in common, this common coupling being coupled through a parallel circuit of a capacitor 82 and a resistor 83 to the base of transistor Q16 which base is also coupled to the positive voltage source through a diode D9 in the low resistance direction. The common collector coupling of transistors Q18 and Q19 is also coupled through a resistor 84 to the base of transistor Q20, the emitter of which is directly coupled to the positive voltage source and the collector of which is coupled through a resistor 85 to a negative voltage source, such as −3 volts shown as an example. The output taken from the collector of transistor Q20 is through a resistor 86 to the output conductor 61 connected to the base of transistor Q9 in the initial gate circuit 90. Accordingly, the echo selector 60 produces a time interval following the initial pulse from the transducer 20 on the output 61 in accordance with the timing adjustment of resistor 77 to open the initial gate 90 to the initial detector and final gate drive 95, the output of which controls the final gate circuit 50 in a manner which will be more fully described in the description of operation.

Figure 3:
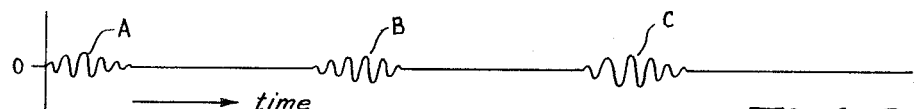
FIGURE 3 is an illustration of a series of echo pulse packets on a time basis.

Referring to FIGURE 3 there is illustrated the echo pulse packets electrically of the acoustical echo pulses impinging the submerged crystal 23 in the transducer 20. These echo pulse packets are shown by the reference characters A, B, and C. Each echo pulse packet A, B, and C are made up of twenty to thirty sinusoidal-like cycles at the resonant frequency of the transducer. These echo pulse packets will gradually dampen out but usually make well in excess of thirty round trips so that one of these echoes may be selected by the echo selector for use in making velocity measurements. If the transducer crystal 23 is used in a sound path of approximately 10 centimeters, for example, its transit time will be about 130 microseconds. This interval is increased to about 4 milliseconds by allowing the echoes to make about thirty round trips as selected by the echo selector 60 before it trips the transmitter 10. This is necessary in making velocity measurement in liquid due to the unavailability of a time interval meter that can measure 4 milliseconds with a better than four nanosecond precision and thus the name of sing around for the velocimeter in making these velocity measurements.

Figure 4:
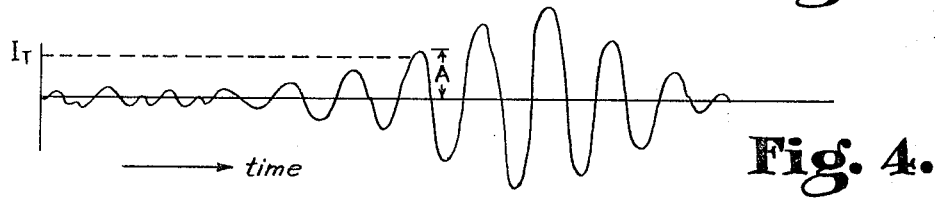
FIGURE 4 is an enlarged view of one of the pulse echo packets.

Referring more particularly to FIGURE 4, one of the echo signal packets is shown enlarged with the established threshold current $I_t$ of the initial detector TD2 projected thereon with the first cycle having an amplitude A greater than the threshold value. This is the first cycle of the echo signal packet which will be detected by the initial detector 95 for controlling the initial gate 90 to detect the first crossover of the sinusoidal-like packet following this detected voltage level or cycle.

Figure 5:
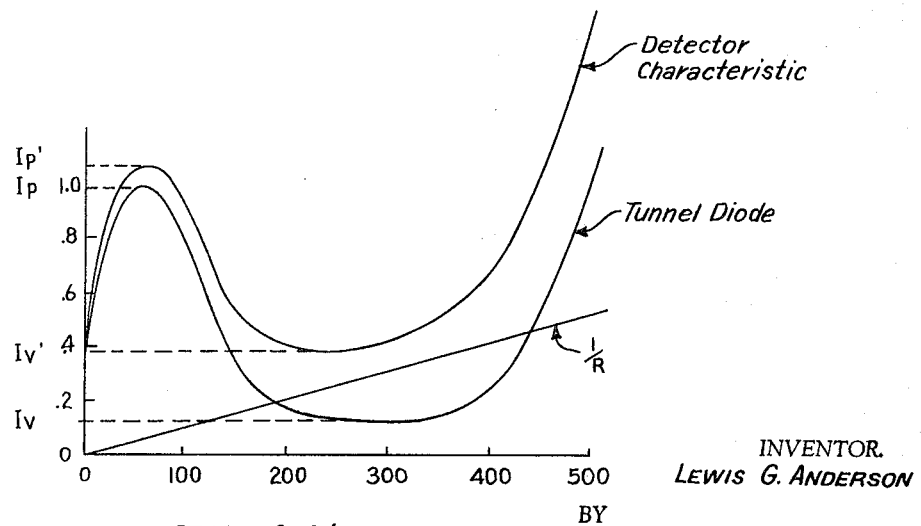
FIGURE 5 is a voltage-current graph showing tunnel diode characteristics.

The basic element used in the detection scheme of both the zero crossing detector and the initial detector is the tunnel diode, herein shown used as TD1 and TD2. While the switching mode of a tunnel diode is considered well known, its characteristics will be further described herein with reference to FIGURE 5 as pertinent to the invention. If the impedance seen at the terminals of the tunnel diode is greater than the equivalent negative resistance in the negative resistance region, then there are two stable states for the device. As the current through the device is increased, it will switch from a low voltage region to a high voltage region. The voltage in the low voltage state is on the order of 50 millivolts, while in the high voltage state it is on the order of a 0.5 volt. When properly connected, this switching can be controlled by the level of an analog signal. It is in this manner that the tunnel diode functions as a detector. Referring particularly to FIGURE 5 the peak current point $I_p$ is, in general, more constant than the valley point $I_v$. In particular its variation with temperature is much less. The transition from the low to the high voltage state occurs very rapidly. Switching times are on the order of three nanoseconds or less. In short, when used in this manner as a detector, the tunnel diode will give an output pulse of slightly less than 0.5 volt with a rise time of only about three nanoseconds whenever the signal level exceeds the threshold value, $I_t$. The relation between $I_t$ and the maximum signal amplitude determines whether this detector is a level detector or a zero crossing detector. The Zener diode ZD1 in FIGURE 2 and resistors 47 and 48 form a current biasing network which reduces $I_t$. The polarity of the tunnel diode and hence the biasing arrangement is determined by the requirement for the negative going pulse to trigger the transmitter. Coupling capacitors 31 and 46 are used to isolate the tunnel diode in the zero crossing detector 45 from any direct currents (DC) that could come from the amplifier or transmitter and cause changes in the tunnel diode bias. The principle of operation of this circuit can be seen by considering the V-I curve of the parallel combination of the tunnel diode and its biasing resistance. FIGURE 5 shows the tunnel diode characteristic, the characteristics of the resistance R, and the resultant characteristic of the combination. The resultant curve is called the Detector Characteristic and so designated in FIGURE 5. From FIGURE 5 it is obvious that a large biasing resistance leaves the detector characteristic very nearly the same as the tunnel diode curve. However a small biasing resistance causes $I_p'$ to be greater than $I_p$ and to be more sensitive to changes in the biasing resistance. A small biasing resistance also decreases the magnitude of the output pulse. It is also apparent that when the biasing resistance gets small enough there is no longer any negative resistance region left in the detector characteristic and no switching can occur. For these reasons the biasing resistance is made greater than the equivalent negative resistance of the tunnel diode by a factor of 100 or so and it has been found that this biasing resistance in the neighborhood of 5,000 to 10,000 ohms works well. The threshold current $I_t$ is determined by the difference between $I_p'$ and $I_b$, where $I_b$ is the bias current of the tunnel diode. $I_t$ therefore equals $I_p'-I_b$. Thus, it is theoretically possible to adjust $I_b$ such that $I_t$ could equal zero. However, it was found that it was not possible to make $I_t=0$ due to the configuration of the transmitter. To understand the reason for this it is necessary to consider the detector operation in more detail. With reference to FIGURE 5 again it is seen that there are three modes of operation depending on the value of $I_b$. These correspond to $I_b<I_v$, $I_v<I_b<I_p$, and $I_b>I_p$. In the first and last cases there is only one stable state for the detector with no input signal applied. For $I_b<I_v$ the detector must be in the low voltage state quiescently. For $I_b>I_p$ the detector must be in the high voltage state quiescently. In the case where $I_v<I_b<I_p$ both the high and low voltage states are stable for the condition of no input signal. In many applications it is of no consequence which state the detector is in before the arrival of the signal. The transition from the low to the high voltage state will occur whenever the input signal, as shown in FIGURE 4, exceeds $I_t$ regardless of the state the detector was in quiescently as long as the preceding negative peak of the signal was less than $I_v$. The only difference observable at the output of the tunnel diode detector is that when the detector is initially in the high voltage state, a negative transition occurs before the desired transition from the low to the high voltage state. Difficulty arises with the present transmitter circuit when the desired transition is closely preceded by one of the opposite direction. Since the transmitter requires a negative going pulse to trigger it, the polarity of the detector is inverted in relation to the V-I curve in FIGURE 5. Thus a transition from the high to the low voltage state of the detector characteristic in FIGURE 5 corresponds to a negative going input pulse to the transmitter 10. A negative going pulse here will turn on Q5 and cause the transmission to occur. However, if this negative going transition is closely preceded by a positive one, Q5 is not turned on and triggering is not accomplished. The term "closely preceded" means short relative to the time constant of the capacitor coupling network of the detector to the transmitter. The result of all of this is that $I_b$ cannot be made too close to or greater than $I_p$ or the detector will not trigger the transmitter. It has been found that if $I_b$ is made approximately 0.6 of a milliampere when $I_p$ is equal to 1 milliampere, the detector will work very well. The 0.4 milliampere gap between $I_b$ and $I_p$ is necessary to insure that some slow transient or noise signal will not switch the detector into its high voltage state prematurely. One example of operation for the zero crossing detector TD1 is to use a 15,000 ohm resistor for 47 and a 250 ohm resistor for 48. The resistor 97 for biasing TD2 can be 560 ohms.

Operation

In the operation of this velocimeter, when the circuit of FIGURE 2 is switched on for the application of all the voltages, the transmitter with transistors Q5 and Q6 will be quiescent as well as the transducer 20. While the amplifier 30 will be in its amplification condition, no signals will be applied thereto and the zero crossing detector and the initial detector will be isolated from DC voltages by their coupling capacitors. Transistor Q20 in the echo selector will be nonconducting placing negative voltage on the base of transistor Q9 opening the initial gate 90; however, no signals are being transmitted to this gate. Accordingly, there is no output of the initial detector and final gate drive 95 and no output on the conductor means 96 to the transistor Q4 in the final gate 50 therefore no output signals are being developed to trigger the transmitter.

To start the system the starting switch S is depressed momentarily to apply a negative voltage to the transmitter 10 which will develop a negative pulse on its output 11 to rapidly discharge the capacitor 24 producing a reaction of crystal 23 to produce an acoustical pulse in the liquid under test. This transmitter pulse is conducted by way of conductor means 22 to start the time interval measuring equipment 55 and at the same time to activate the echo selector 60. This negative pulse applied to the inverter transistor Q12 produces a positive pulse through the coupling capacitor 65 and the diode D6 to the transistor Q13 immediately switching this monostable multivibrator Q13, Q14 rendering Q13 conductive and Q14 nonconductive producing a positive output pulse to the base of transistor Q17 for a sufficient time interval to allow the timing capacitor 75 to charge to the negative voltage applied through the emitter collector path of transistor Q17. This negative voltage cuts off transistor 15 which is operative in the zero dead time monostable multivibrator to place transistor 20 into conduction thereby placing a positive voltage on the base of transistor Q9 in the initial gate 90 closing this gate. Transistor Q11 in the final gate drive is initially in its conductive state producing a positive voltage on the output 96 to the base of transistor Q4 in the final gate also maintaining the final gate 50 closed. As echo pulses are received at the crystal 23 and converted into electrical pulse packets, these electrical pulse packets are applied over the conductor means 21 to the amplifier but these amplified pulses are grounded through transistors Q4 and Q9. As capacitor 75 in the echo selector circuit charges positively through the resistor 76 and the adjustable resistor 77 to the point of placing transistor Q15 in conduction, echo pulses are being received and grounded through transistors Q4 and Q9. The capacitor 75 and resistors 76 and 77 produce a time interval (of approximately 4 milliseconds for the example of a 10 centimeter sound path) to allow twenty-nine echo pulses to be received. After the twenty-ninth echo pulse is received, transistor Q15 is rendered conductive to switch the zero dead time monostable multivibrator to switch transistor 20 to its nonconductive state thereby placing the negative voltage on the base of transistor Q9 opening initial gate 90 whereby the next succeeding echo pulse applied to the amplifier 30 will pass to the initial detector TD2 and final gate drive 95. As viewed in FIGURE 4, when the first cycle of the echo pulse packet exceeds the threshold voltage established by the biasing diodes D2, D3 and resistor 97 on the tunnel diode detector TD2, this detector is immediately switched switched producing a negative pulse on the base of transistor Q10 through the coupling diode D5 to switch the monostable multivibrator final gate drive Q10, Q11 turning on Q10 and turning off Q11 to produce a negative pulse on the output 96 applied to the base of transistor Q4 in the final gate 50. The diode D5 enables the monostable multivibrator including transistors Q10 and Q11 to produce a one and one-half to two microsecond negative pulse on the output 96 although the tunnel diode detector TD2 will be switched back to its original state. The initial detector TD2, then, operates as a level detector to detect the first cycle of an amplitude greater than the threshold voltage etablished by the detector in each echo pulse packet. This same amplified echo pulse packet signal through the cascaded amplifier circuit including transistors Q2 and Q3 will at the same time be applied to the zero crossing detector including the tunnel diode TD1 which will thereafter detect the first crossover of the voltage cycle in this echo packet following the initially detected cycle to switch TD1 producing approximately a one-half volt negative pulse which is gated through the final gate 50 to trigger transmitter 10 for the production of the next succeeding negative pulse to the transducer. The second transmitted pulse will be applied over the conductor means 22 to the time interval measuring equipment 55 which will measure the time interval between pulses for calibrating the velocity of the sound through the liquid in which the crystal 23 is emerged. From this measured velocity the pressure of the liquid can be readily calibrated. Accordingly, every thirtieth echo cycle after the initial transmitted pulse will trigger the transmitter to produce succeeding pulses in a sing-around manner for measurement of the velocity of the acoustical sounds in the liquid under test. The initial detector TD2 in 95 and the zero crossing detector TD1 in 45 are operated in close sequence to determine the same amplitude level in each selected echo packet and the first crossover after this detected cycle to produce an exceedingly accurate measurement at the same point in each echo pulse packet to produce very accurate measurements of the acoustical velocity in liquids. This accuracy is enhanced by acquiring sing-around readings in the order of 256 and measuring the velocity for the total elapsed time.

While many modifications and changes may be made in the constructional details and features of this invention as by use of other applicable voltages to accommodate other electronic elements or components as NPN or PNP type transistors to accomplish the same or like results or functions, applicant desires to be limited in the spirit of his invention only by the scope of the appended claims.

I claim:

1. In a sing around velocimeter having a transimitter for generating electrical pulses that are transduced by a transducer to accoustical waves in a liquid and echoed back to the transducer from an object to be transduced to electrical echo pulse packets for velocity measurement by time interval measuring equipment, the invention which comprises:
   a final gate having a signal input, a control input, and an output coupled to said transmitter;
   a zero-crossing detector having an input and having an output coupled to the signal input of said final gate for gating zero crossover detected signals;
   an initial gate having control and signal inputs, an initial detector, and a final gate drive coupled in series from said initial gate to said control input of said final gate to open said final gate when said initial detector detects a signal of greater amplitude than a threshold level preset therein;
   an amplifier coupled to said transducer output and having two amplified outputs of said electrical echo pulse packets, one output coupled to the input of said zero-crossing detector and the other output coupled to the signal input of said initial gate; and
   an echo selector circuit having an input coupled to said transducer output and an output coupled to the control input of said initial gate to time a predetermined number of received electrical echo pulse packets after which a signal is applied to control the opening of said initial gate whereby the initial detector will detect the first cycle in the next succeeding pulse packet of an amplitude exceeding said threshold level to control the opening of said final gate to allow the first detected zero crossover of the detected cycle to pass through said final gate to trigger said transmitter, thereby permitting said time interval measuring equipment to measure the velocity of said acoustical pulses in the liquid.

2. In a sing around velocimeter as set forth in claim 1 wherein
   said zero-crossing detector and said initial detector are each tunnel diode circuits, said zero-crossing detector tunnel diode being biased to detect each electrical echo signal crossing zero potential and said initial detector tunnel diode being biased to said threshold level to detect each electrical echo signal of predetermined amplitude.

3. In a sing around velocimeter as set forth in claim 2 wherein
   said amplifier has two amplifier channels to produce said two amplifier outputs, each channel having an emitter follower transistor amplifier therein to isolate the zero-crossing detector and said initial detector from each other.

4. In a sing around velocimeter as set forth in claim 3 wherein
   said initial and final gates consist each of a transistor having its emitter and collector coupled between ground potential and the electrical echo pulse packet carrying conductor and having its base coupled to said gate control input to produce a gate open condition when said transistor is nonconductive and to produce a gate closed condition when said transistor is conductive.

5. In a sing around velocimeter as set forth in claim 4 wherein
   said tunnel diode of said zero-crossing detector is biased through a Zener diode and resistor network across a voltage source.

6. In a sing around velocimeter as set forth in claim 5 wherein
   said tunnel diode of said initial detector is biased through a pair of diodes and a resistor in series across a voltage source.

References Cited

UNITED STATES PATENTS 2,708,366   5/1955   Blocher et al. _____ 340—55

OTHER REFERENCES

Cedrone et al., Electronic Method for Measuring the Velocity of Sound in Liquids, Journal of Acoustical Society of America, vol. 26, No. 6, November 1954, pp. 963–966.

Ficken, et al. "Sing-Around," Method for Determination of Sound Velocities, Journal of Acoustical Society of America, vol. 28, No. 5, September 1956, pp. 921–923.

Greenspan et al., Sing-Around Ultrasonic Velocimeter for Liquids, Review of Scientific Instruments, vol. 28, No. 11, November, 1957, pp. 897–901.

Wilson et al., Sound Velocity Measurement in Liquids, Electronics, vol. 33, No. 37, Sept. 9, 1960, pp. 69–76.

Forgacs, Precision Ultrasonic Velocity Measurements, Electronics, vol. 33, No. 47, Nov. 18, 1960, pp. 98–100.

Dulberger, Deep-Ocean Velocimeter Aids Sonar Systems Design, Electronics, vol. 34, No. 22, June 2, 1961, pp. 41–43.

SAMUEL FEINBERG, *Primary Examiner.*

R. M. SKOLNIK, *Assistant Examiner.*